United States Patent
Sishtla et al.

(10) Patent No.: US 10,544,801 B2
(45) Date of Patent: Jan. 28, 2020

(54) CENTRIFUGAL COMPRESSOR PART LOAD CONTROL ALGORITHM FOR IMPROVED PERFORMANCE

(75) Inventors: Vishnu M. Sishtla, Manlius, NY (US); Joost Brasz, Fayetteville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 2009 days.

(21) Appl. No.: 13/388,876

(22) PCT Filed: Oct. 19, 2010

(86) PCT No.: PCT/US2010/053104
§ 371 (c)(1), (2), (4) Date: May 15, 2012

(87) PCT Pub. No.: WO2011/049891
PCT Pub. Date: Apr. 28, 2011

(65) Prior Publication Data
US 2012/0219431 A1 Aug. 30, 2012

Related U.S. Application Data

(60) Provisional application No. 61/253,612, filed on Oct. 21, 2009.

(51) Int. Cl.
*F04D 29/46* (2006.01)
*H02H 3/05* (2006.01)
(Continued)

(52) U.S. Cl.
CPC ......... *F04D 29/462* (2013.01); *G05D 7/0664* (2013.01); *G05D 7/0688* (2013.01);
(Continued)

(58) Field of Classification Search
CPC .... F04D 27/02; F04D 27/0246; F04D 29/462; G05D 7/0635; G05D 7/0664;
(Continued)

(56) References Cited

U.S. PATENT DOCUMENTS

| 4,151,725 A | 5/1979 | Kountz et al. |
| 4,503,684 A * | 3/1985 | Mount ............... F04D 27/0246 415/14 |

(Continued)

FOREIGN PATENT DOCUMENTS

| CN | 2536821 Y | 2/2003 |
| CN | 1904503 A | 1/2007 |

(Continued)

OTHER PUBLICATIONS

Federal Register, vol. 79. No. 241/ Thursday, Dec. 16, 2014/ Rules and Regulations, 74618-74633.*

(Continued)

*Primary Examiner* — Christopher S Bobish
(74) *Attorney, Agent, or Firm* — Cantor Colburn LLP

(57) ABSTRACT

A compressor system having a centrifugal compressor, controller and an interface is disclosed. The compressor includes adjustable guide vanes and a variable geometry diffuser. The controller is in electrical communication with each of the guide vanes and diffuser so as to monitor and adjust positions thereof in accordance with a predetermined control algorithm. The control algorithm is implemented in accordance with a method of controlling the centrifugal compressor. The method adjusts the position of the diffuser based on the actual lift, guide vane position and predetermined relationships between diffuser position and reference lift.

20 Claims, 7 Drawing Sheets

(51) Int. Cl.
*G05D 7/06* (2006.01)
*G05D 23/19* (2006.01)
*F04D 27/02* (2006.01)
*H02H 3/00* (2006.01)
*H02J 3/14* (2006.01)

(52) U.S. Cl.
CPC ..... *G05D 23/1917* (2013.01); *G05D 23/1934* (2013.01); *H02H 3/05* (2013.01); *F04D 27/02* (2013.01); *G05D 7/0635* (2013.01); *H02H 3/006* (2013.01); *H02J 3/14* (2013.01)

(58) Field of Classification Search
CPC ............ G05D 7/0688; G05D 23/1917; G05D 23/1934; F16K 37/0075; H02H 3/006; H02H 3/05; H02J 3/14; F24F 11/0009
USPC ........... 417/53, 212; 415/1, 164, 165, 211.2; 700/282, 295, 292, 277, 27
See application file for complete search history.

(56) References Cited

U.S. PATENT DOCUMENTS

| | | | |
|---|---|---|---|
| 4,616,483 A * | 10/1986 | Leonard | 62/115 |
| 4,643,635 A | 2/1987 | Leachman, Jr. | |
| 4,646,530 A | 3/1987 | Huenniger | |
| 4,686,834 A * | 8/1987 | Haley | F04D 27/02 62/209 |
| 4,689,967 A | 9/1987 | Han et al. | |
| 4,715,190 A * | 12/1987 | Han | F25B 49/022 62/201 |
| 5,222,356 A * | 6/1993 | Evenson et al. | 60/773 |
| 5,807,071 A * | 9/1998 | Brasz et al. | 415/150 |
| 5,851,103 A * | 12/1998 | Harada et al. | 415/17 |
| 5,895,204 A | 4/1999 | Sishtla et al. | |
| 5,911,127 A | 6/1999 | Tulpule | |
| 6,036,432 A | 3/2000 | Sishtla et al. | |
| 6,129,511 A * | 10/2000 | Salvage et al. | 415/150 |
| 6,427,464 B1 * | 8/2002 | Beaverson | F04D 27/0207 62/129 |
| 6,463,748 B1 * | 10/2002 | Benedict | F04D 27/0284 62/228.1 |
| 6,506,011 B1 | 1/2003 | Sishtla | |
| 6,581,399 B2 | 6/2003 | Benedict et al. | |
| 6,607,353 B2 * | 8/2003 | Masutani | 415/161 |
| 6,814,540 B2 * | 11/2004 | Sishtla et al. | 415/150 |
| 7,356,999 B2 | 4/2008 | Bodell, II et al. | |
| 7,824,148 B2 * | 11/2010 | Tetu et al. | 415/1 |
| 7,905,102 B2 * | 3/2011 | Bodell, II | F04D 27/0207 415/119 |
| 2003/0105535 A1 * | 6/2003 | Rammler | G05B 19/409 700/17 |
| 2005/0241323 A1 | 11/2005 | Miller et al. | |
| 2006/0225445 A1 | 10/2006 | Lifson et al. | |
| 2007/0214787 A1 * | 9/2007 | Noelle | F02B 37/24 60/602 |
| 2007/0248453 A1 * | 10/2007 | Tetu et al. | 415/17 |
| 2007/0261421 A1 | 11/2007 | Pierson | |
| 2008/0253877 A1 * | 10/2008 | Bodell | F04D 27/0207 415/13 |
| 2009/0064711 A1 | 3/2009 | Knight et al. | |
| 2011/0048046 A1 * | 3/2011 | Sommer | F04D 17/12 62/228.1 |

FOREIGN PATENT DOCUMENTS

| | | |
|---|---|---|
| CN | 201159212 Y | 12/2008 |
| WO | WO-2006/017365 A2 | 2/2006 |
| WO | WO 2009 058975 A1 | 5/2009 |

OTHER PUBLICATIONS

International Search Report and Written Opinion for related International Application No. PCT/US2010/053104; dated Jan. 17, 2011.
Chinese Office Action for related Chinese Application No. 2010-80047355.6; dated Feb. 19, 2014.

* cited by examiner

CENTRIFUGAL COMPRESSOR PART LOAD CONTROL ALGORITHM FOR IMPROVED PERFORMANCE

CROSS-REFERENCE TO RELATED APPLICATION

This application is a 35 USC § 371 US National Stage Patent Application of International Patent Application No. PCT/US2010/053104 filed on Oct. 19, 2010, and claims priority under 35 USC § 119(e) to U.S. Provisional Patent Application Ser. No. 61/253,612 filed on Oct. 21, 2009.

BACKGROUND

1. Technical Field

This disclosure is directed to compressor control, and more particularly, to control algorithms for improving the performance of centrifugal compressors under part load.

2. Description of the Related Art

Centrifugal compressors are well known in the art of refrigeration systems and are typically designed to rotate at fixed or predetermined operating speeds. Capacity control of the machine is normally accomplished by varying the position of a series of adjustable guide vanes located at the inlet of the machine. The mass rate of flow of refrigerant delivered to the impeller is thus varied to meet the changing load demands made on the machine. At maximum flow, the refrigerant leaving the impeller may be more than the diffuser can handle and the flow may become choked at the diffuser. At lower flow rates, the flow of refrigerant moving through the diffuser may become unstable and a partial flow reversal may take place, resulting in noise and a dramatic reduction in machine efficiency. Eventually a complete reversal in flow is experienced whereupon the compressor may stall or surge. The range between a choke condition and the onset of a surge condition generally defines the operating range of a compressor. In a compressor relying solely upon the inlet guide vanes for capacity control, this range is narrow, particularly when vanes are used in the diffuser.

Accordingly, one of the major problems associated with the use of centrifugal compressors is that of maintaining flow stabilization when the compressor load varies over a wide range. The compressor inlet, impeller and diffuser passages must be sized to provide for the maximum volumetric flow rate. When there is a relatively low volumetric flow rate through such a compressor, the flow becomes unstable. More specifically, as the volumetric flow rate is decreased from a stable range, a range of slightly unstable flow is entered. In this range, there occurs a partial reversal of flow in the diffuser passage, creating noise and lowering the compressor efficiency. Below this range, the compressor encounters surge, wherein complete flow reversals in the diffuser passage take place, destroying the efficiency of the machine and endangering the integrity of the machine elements.

Since a wide range of volumetric flow rates is desirable in many compressor applications, numerous modifications have been suggested to improve flow stability at low volumetric flow rates. The prior art has attempted to control surge in centrifugal compressors by providing variable guide vanes that control the flow of refrigerant through the compressor. While this technique has helped, it has not been completely effective, as fluid flow through the diffuser accounts for most of the conditions that cause surge. Similarly, variable geometry pipe or vaned diffusers for centrifugal compressors have been disclosed to provide improved control of compressor performance under changing loads, and further, to avoid instances of surge. For example, a variable diffuser may include inner and outer rings having complementary inlet flow channel sections formed therein. The inner and outer rings may be rotatable with respect to one another, thereby allowing for the adjustment of fluid flow through the flow channels.

Among comparable compressors, centrifugal compressors with vaned or piped diffusers have the highest efficiency at full load. However, the surge margin is relatively low at part load. Variable diffusers may be used to overcome drawbacks associated with the low surge margin at part load. Moreover, variable diffusers are generally adjusted according to a fixed relationship between the inlet guide vane and the diffuser to achieve the highest surge margin. However, the resulting efficiency of a compressor optimized for surge at part load is poor when operated along a desired load line for a particular geographic region. Performance may be improved by using a schedule specifically dedicated to a given load line. However, improved performance at part load comes only at the expense of a lower surge margin.

Accordingly, there is a need for an improved method for controlling a centrifugal compressor that maintains full load performance and efficiency, and significantly improves part load performance and efficiency without adversely affecting the surge margin.

SUMMARY OF THE DISCLOSURE

In satisfaction of the above-described needs, a compressor system having a centrifugal compressor and an improved controller is disclosed. The compressor includes adjustable guide vanes and a variable geometry diffuser. The controller is in electrical communication with each of the guide vanes and diffuser so as to monitor and adjust positions thereof in accordance with a predetermined control algorithm. The control algorithm is implemented in accordance with a method of controlling the centrifugal compressor.

In accordance with one aspect of the disclosure, a method for controlling a centrifugal compressor having adjustable guide vanes and a variable diffuser is disclosed. The method comprises the steps of determining actual lift; determining guide vane position; determining a relationship between diffuser position and reference lift based on the guide vane position; determining a new diffuser position based on the actual lift, guide vane position and the relationship between diffuser position and reference lift; determining a full load reference lift based on the actual guide vane position; adjusting the diffuser to a fully opened position if the actual lift is less than or equal to the full load reference lift; and adjusting the diffuser to the new diffuser position if the actual lift is greater than the full load reference lift.

In accordance with another aspect of the disclosure, a method for controlling a centrifugal compressor having adjustable guide vanes and a variable diffuser after compressor startup is disclosed. The method comprises the steps of determining a first relationship between guide vane position and full load reference lift; determining actual lift; adjusting the diffuser to a fully opened position if the actual lift is less than the full load reference lift; determining a second relationship between guide vane position and diffuser position at part load; determining a third relationship between guide vane position and part load reference lift; determining a fourth relationship between diffuser position and reference lift based on the second and third relationships; determining a new diffuser position based on the fourth relationship; and adjusting the diffuser to the new diffuser position.

In accordance with yet another aspect of the disclosure, a method for controlling a centrifugal compressor having adjustable guide vanes and a variable diffuser is disclosed. The method comprises the steps of determining actual guide vane position; determining a first relationship between guide vane position and diffuser position; determining a first diffuser position based on the first relationship; adjusting the diffuser to the first diffuser position if the compressor is in a startup state; determining a second relationship between guide vane position and full load reference lift; determining full load reference lift based on the second relationship and the actual guide vane position; determining actual lift; adjusting the diffuser to a fully opened position if the actual lift is less than the full load reference lift; determining a third relationship between guide vane position and diffuser position at part load; determining a fourth relationship between guide vane position and part load reference lift; determining a fifth relationship between diffuser position and reference lift based on the third and fourth relationships; determining a second diffuser position based on the fifth relationship; and adjusting the diffuser to the second suggested diffuser position if the compressor is in a normally operating state.

Other advantages and features will be apparent from the following detailed description when read in conjunction with the attached drawings.

BRIEF DESCRIPTION OF THE DRAWINGS

For a more complete understanding of the disclosed methods, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosure or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1A:
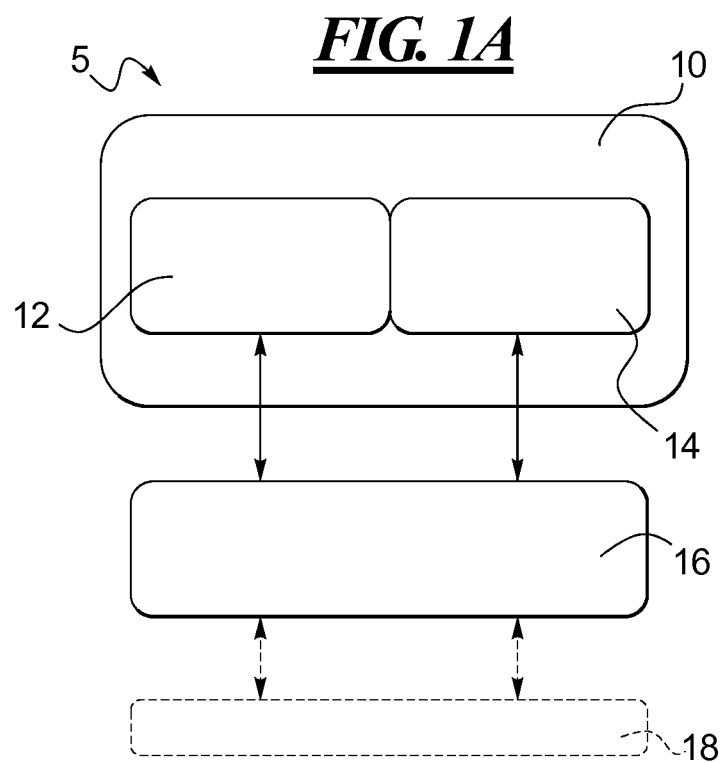
FIG. 1A schematically illustrates a centrifugal compressor with adjustable guide vanes and a variable diffuser in communication with a controller.
Figure 1B:
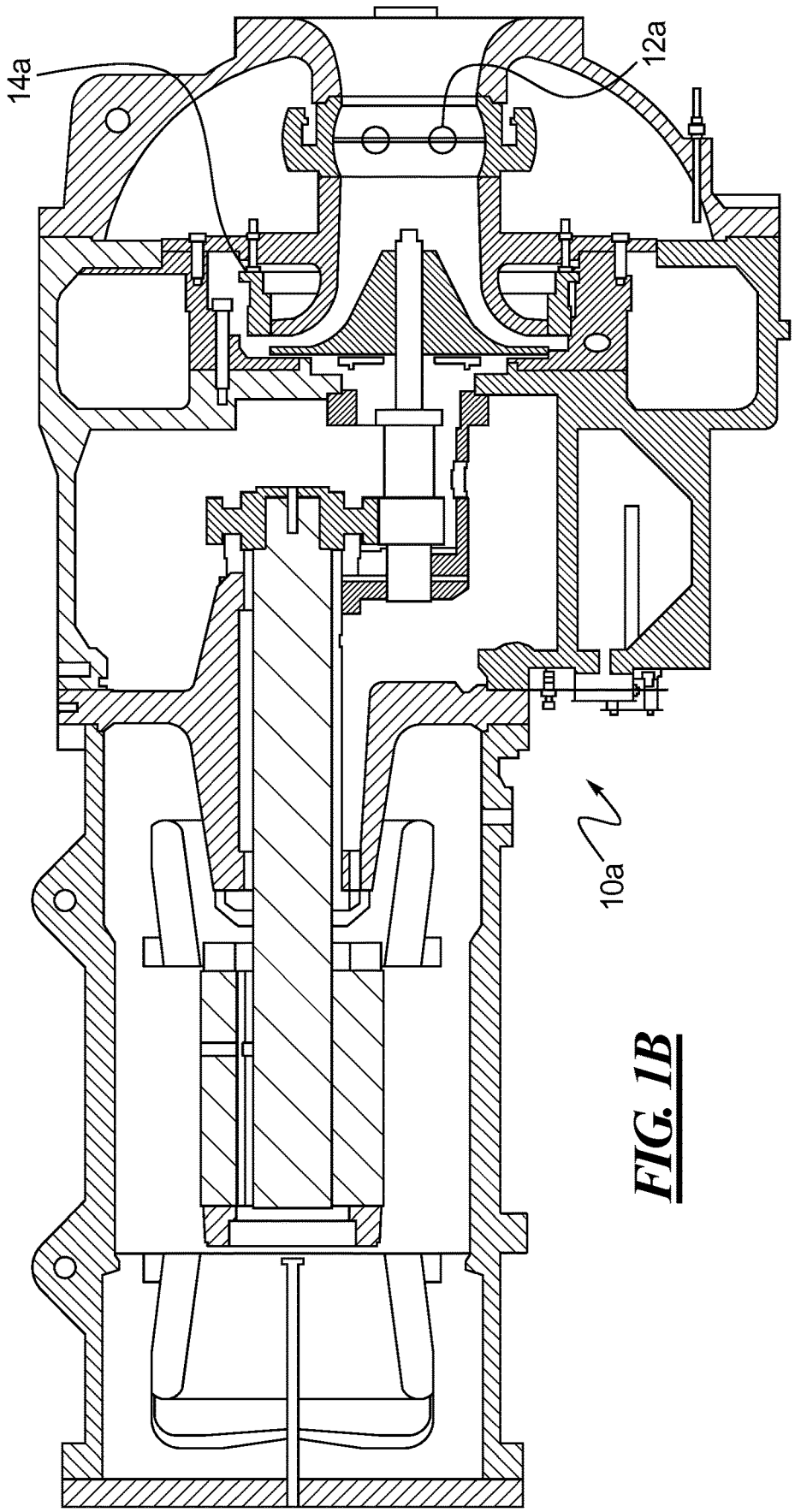
FIG. 1B illustrates a cross-section of a centrifugal compressor with adjustable inlet guide vanes and a variable split ring diffuser.

Turning to FIG. 1A, an exemplary compressor system 5 is provided. The system 5 may include a compressor 10 having inlet guide vanes 12 and a variable geometry diffuser 14. For instance, the compressor 10 may be a centrifugal compressor 10a, as shown in FIG. 1B, having adjustable inlet guide vanes 12a and a split-ring diffuser 14a, or the like. Among other things, the compressor 10 may be provided with a controller 16 in communication with the guide vanes 12 and the diffuser 14 so as to monitor as well as automatically adjust the positions of the guide vanes 12 and the diffuser 14. The controller 16 may optionally provide an interface 18 through which an end user or a service technician may observe a status of the compressor 10 and make any adjustments to control parameters as needed.

Figure 2:
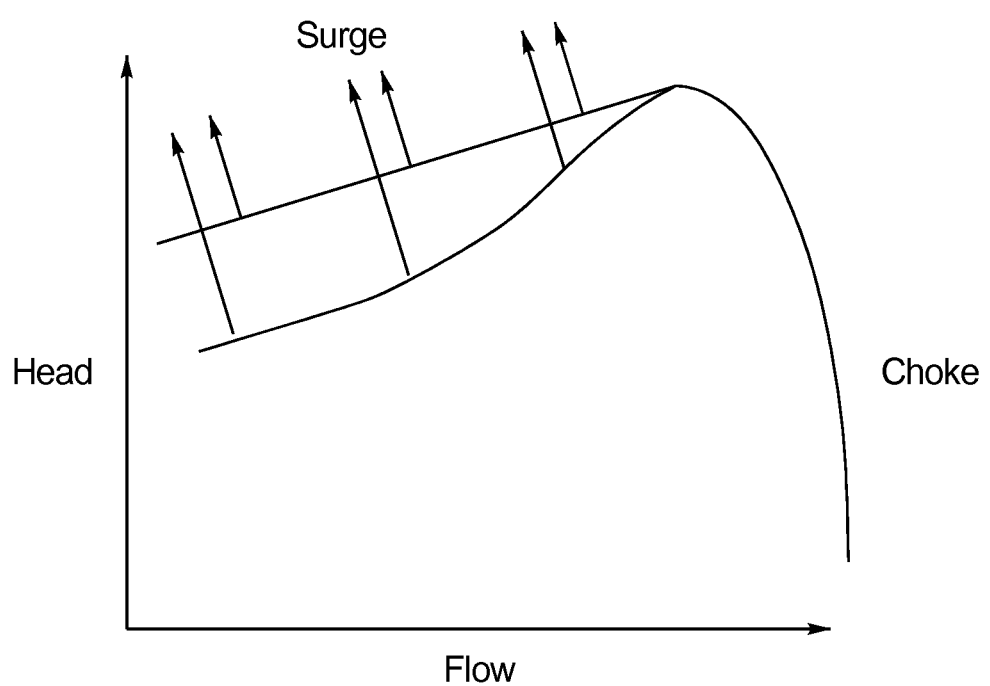
FIG. 2 graphically illustrates an operating map of a disclosed centrifugal compressor.

The performance of a compressor 10 may be graphically represented using an operating map, or a load/lift plot, as shown for example in FIG. 2. The desired load/lift conditions may vary depending on the geographic location of the compressor 10. For example, the lower load line of FIG. 2 may correspond to the United States of America, where humidity levels are relatively low, whereas the higher load line of FIG. 2 may correspond to Asia where humidity levels are relatively high. As indicated by the upwardly pointing arrows of the operating map of FIG. 2, a compressor 10 may enter a surge state if it operates at a point above the respective load lines. Conversely, the compressor 10 may be less than optimally efficient if it operates at a point below the designated load lines shown. It is therefore a common interest in the art of compressors to maintain compressor operation along the respective load lines, and thus, maintain peak performance and efficiency at all loads.

The performance and efficiency of a compressor 10 may be adjusted by controlling the amount of flow therethrough. The flow may be adjusted using actuators, motors, or the like, that are coupled to the respective guide vanes 12 and diffuser 14. More specifically, actuators may be used to mechanically adjust the respective geometries and/or positions of the guide vanes 12 and diffuser 14 to adjust the flow-through area of the compressor 10. The manner in which the actuators of the guide vanes 12 and diffuser are controlled may be managed by the controller 16, or more particularly, a predetermined control algorithm of the controller 16.

Figure 3:
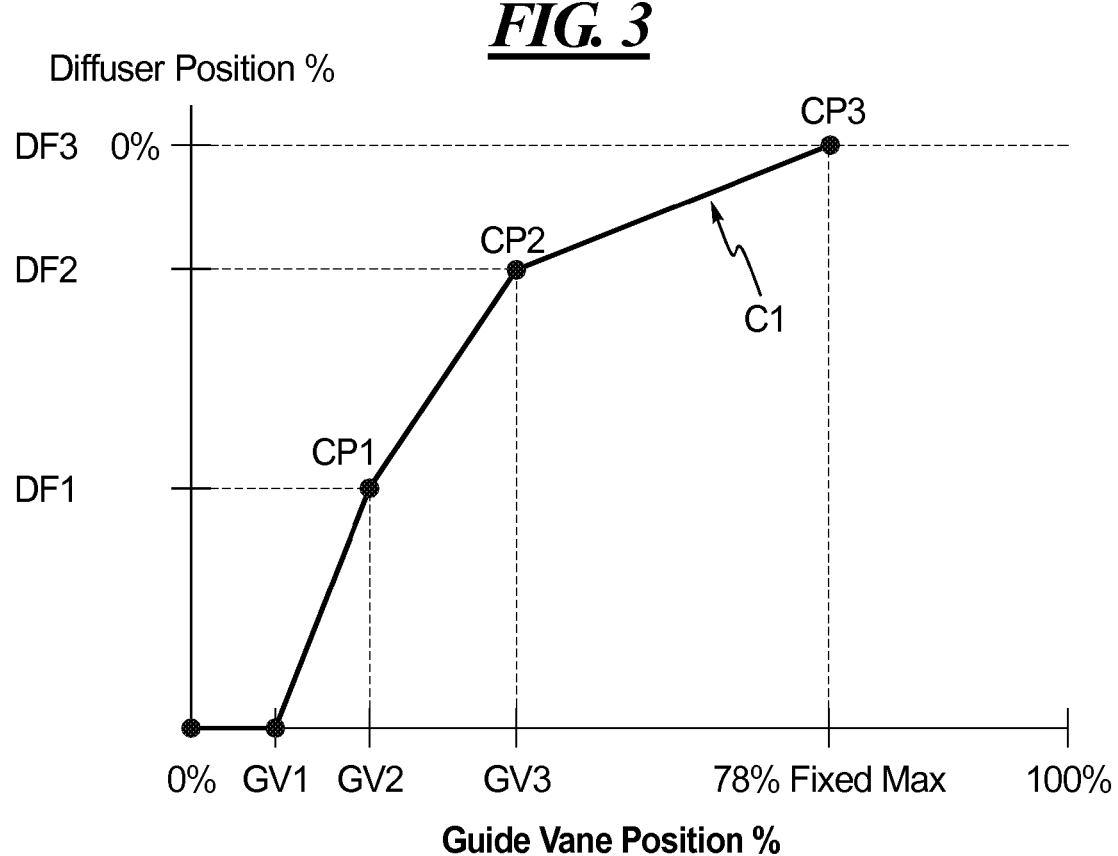
FIG. 3 graphically illustrates a fixed relationship between diffuser and guide vane positions of a disclosed centrifugal compressor.

A control algorithm of a controller 16 may serve to adjust the position of a diffuser 14 based solely on the actual position of its inlet guide vanes 12. More specifically, the diffuser 14 of a compressor 10 may be controlled according to a predetermined relationship between optimal diffuser and guide vane positions, as shown in FIG. 3. The diffuser position profile C1 of FIG. 3 may be formed using a plurality of control points CP1, CP2, CP3 corresponding to ideal or optimum compressor 10 performance determined during testing of the compressor 10. The control points CP1, CP2, CP3 may include guide vane load points GV1, GV2, GV3 as well as diffuser load points DF1, DF2, DF3, wherein each load point corresponds to a percentage of the fully opened positions of the guide vanes 12 and diffuser 14, respectively. Linear interpolation of the control points CP1, CP2, CP3 may provide the profile, or curve C1 of FIG. 3, and further, provide a reference by which the control algorithm of the controller 16 may determine the next best diffuser position.

However, the performance and efficiency of a compressor 10 controlled by such an algorithm may not be optimized at all load levels. Such inconsistencies may be caused by differences between the saturation temperatures of the condenser and the cooler, or lift, of the compressor 10. To accommodate for such inconsistencies in performance, an improved controller 16 or control algorithm for a compressor 10 may be configured to control the position of a diffuser 14 based at least in part on lift as well as inlet guide vane 12 position. More specifically, the control algorithm may be provided with predetermined profiles for optimized diffuser position and lift with respect to guide vane position at part and full loads.

Figure 4:
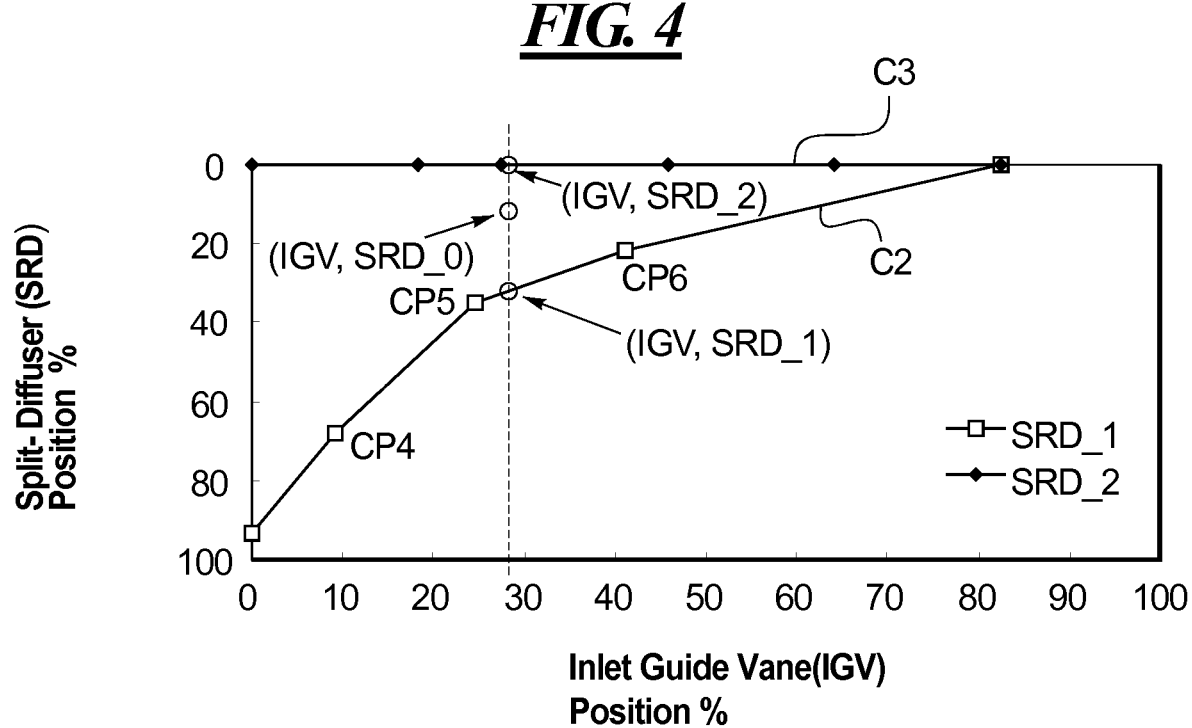
FIG. 4 graphically illustrates full and part load relationships between diffuser and guide vane positions.

As shown in FIG. 4, part and full load profiles C2, C3 for diffuser position is provided as a function of guide vane position. In particular, the two diffuser position profiles, or curves C2, C3, correspond to optimum diffuser positions at part and full load, respectively. As with the plot of FIG. 3, the part load curve C2 of FIG. 4 may be formed by interpolating a plurality of control points CP4, CP5, CP6 corresponding to ideal or optimum compressor 10 performance and may be determined by testing. The control points CP4, CP5, CP6 may include guide vane load points GV4, GV5, GV6 as well as diffuser load points DF4, DF5, DF6, wherein each of the load points correspond to a percentage of the fully opened positions of the guide vanes 12 and diffuser 14, respectively. Curve C3 may correspond to diffuser position at full load, or a fully opened diffuser position, and therefore, may be constant or zero for all guide vane positions.

Figure 5A:
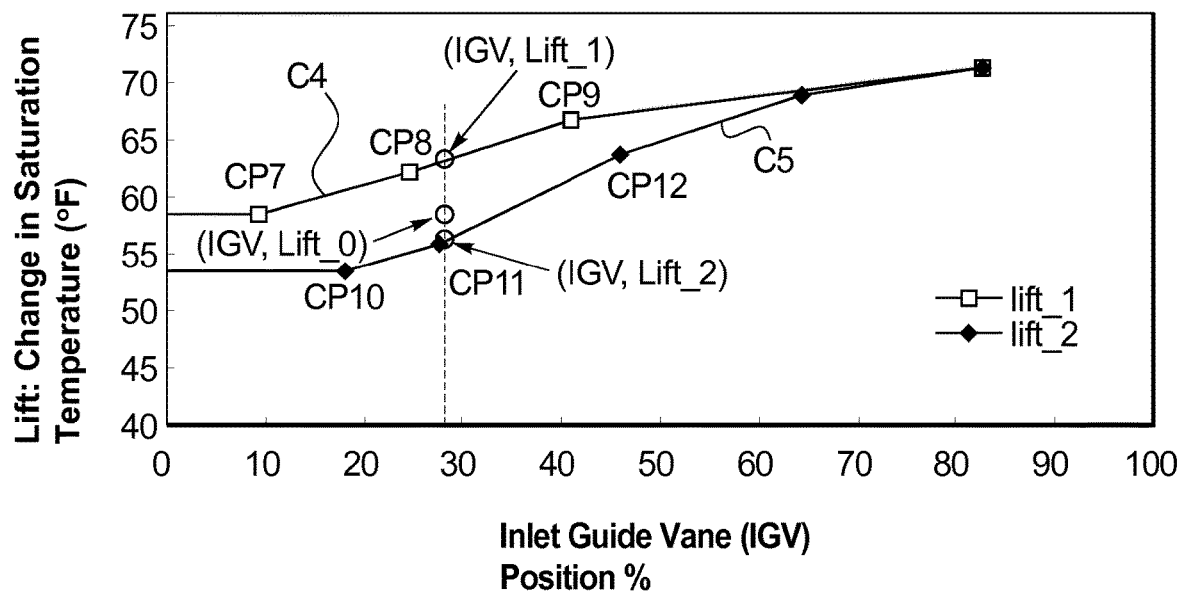
FIG. 5A graphically illustrates full and part load relationships between reference lift and guide vane position according to a first approach of controlling a disclosed centrifugal compressor.

Turning to FIG. 5A, part and full load profiles C4, C5 for reference lift as a function of guide vane position is provided according to a first approach. The manner in which the reference lift profiles C4, C5 are determined in the first approach may be similar to that of the diffuser position profiles C1, C2 of FIGS. 3 and 4, respectively. For instance, the upper curve C4 of FIG. 5A may be a linear interpolation of reference lifts or control points CP7, CP8, CP9 at part load, for example, a 0.5 degree turndown load line—corresponding to a 0.5 degree reduction in the entering condenser water temperature for every 10% change in load, or a 0.0 degree turndown load line—corresponding to an entering condenser water temperature which remains constant from 100% to 10% load. The lower curve C5 may be a linear interpolation of reference lifts or control points CP10, CP11, CP12 at full load, for example, corresponding to a fully opened diffuser position with variable inlet guide vanes. The reference lift profiles, or curves C4, C5, may be derived from testing and preprogrammed into a control algorithm of a controller 16. When actual lift is measured, the controller 16 may compare the actual lift with the reference lift profiles C4, C5 to determine the next best position to which the diffuser 14 should be adjusted for optimum performance.

Figure 5B:
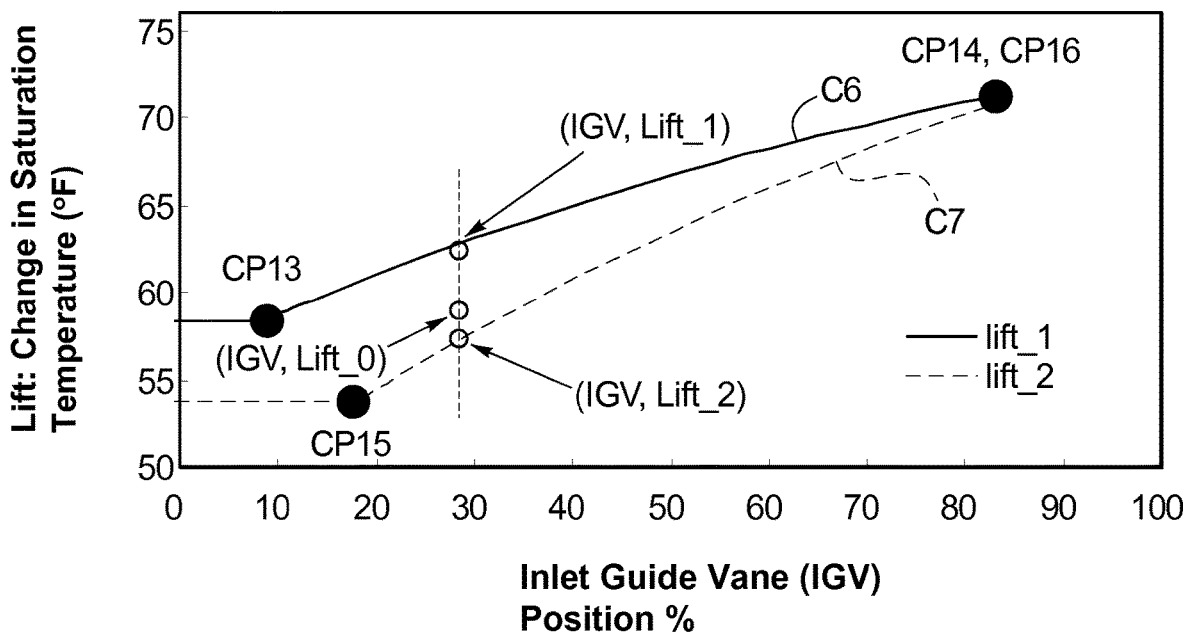
FIG. 5B graphically illustrates full and part load relationships between reference lift and guide vane position according to a second approach of controlling a disclosed centrifugal compressor.

Alternatively, the control algorithm of a controller 16 may be provided with reference lift profiles C6, C7 according to a second approach. Specifically, the upper curve C6 of FIG. 5B may correspond to a reference lift profile at part load, for example, 0.5 degree turndown load line, or alternatively 0.0 degree turndown load line, while the lower curve C7 may correspond to a reference lift profile corresponding to a fully opened diffuser position with variable inlet guide vanes. In contrast to the first approach of FIG. 5A, the second approach may obtain the reference lift profiles, or curves C6, C7, using two-point fitting curves. Moreover, only four reference lifts or control points are needed to approximate the two curves C6, C7, wherein the control points are based on inlet guide vane position, diffuser position, lift and a shape factor. For instance, curve C6 may be formed using control points CP13, CP14, while curve C7 may be formed using control points CP15, CP16. If the maximum lifts of curves C6, C7 of FIG. 5B, or control points CP14, CP16, are equal, only three reference points are required. Each reference lift curve C6, C7 may be obtained according to the expression $$Lift = Lift_{min} + \frac{-Lift_{max} + Lift_{min} + (Lift_{max} - Lift_{min})e^{k_{sf}(GV_{actual}-GV_{min})}}{e^{k_{sf}(GV_{max}-GV_{min})} - 1} \quad (1)$$

where $GV_{actual}$ is the actual guide vane position, $GV_{min}$ is the minimum guide vane position, $GV_{max}$ is the maximum guide vane position, $Lift_{min}$ is the reference lift value at the minimum guide vane position, $Lift_{max}$ is the reference lift value at the maximum guide vane position and $k_{sf}$ is the curve shape factor. The shape factor may serve to mitigate any increased risk of surges or other drawbacks associated with using two-point fitting curves rather than original reference data as in the first approach. The curve shape factor $k_{sf}$ of both curves C6, C7 of FIG. 5B is −0.01. As with the profiles C4, C5 of FIG. 5A, the reference lift profiles, or curves C6, C7, may be preprogrammed into a control algorithm of a controller 16. When actual lift is measured, the controller 16 may compare the actual lift with the reference lift profiles C6, C7, to determine the next best position to which the diffuser 14 is adjusted for optimum performance.

By preprogramming a controller 16 with such diffuser position and lift profiles, the control algorithm of a controller 16 may automatically determine the best new diffuser position for the compressor 10 at any load and make adjustments accordingly. Furthermore, the control algorithm may establish reference lift profiles according to one or more of the two approaches disclosed herein. Moreover, the approach to which to determine reference lift may be an option selectable to an end user or a service technician via the user interface 18 of the controller 16, or the like.

Figure 6A:
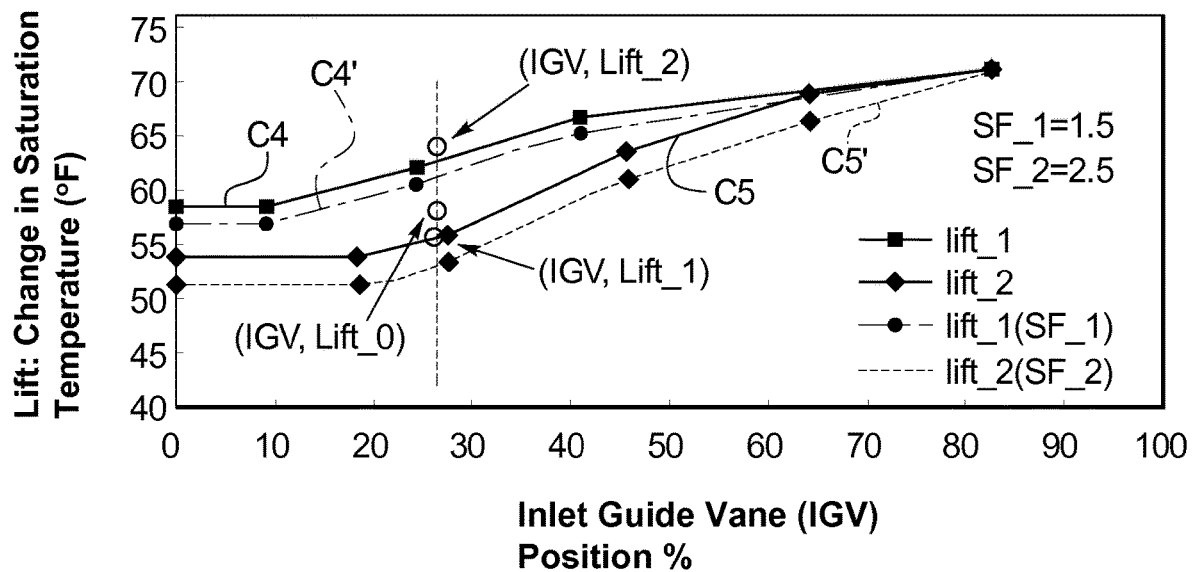
FIG. 6A graphically illustrates safety controlled full and part load relationships between reference lift and guide vane position according to a disclosed first approach of controlling a disclosed centrifugal compressor.
Figure 6B:
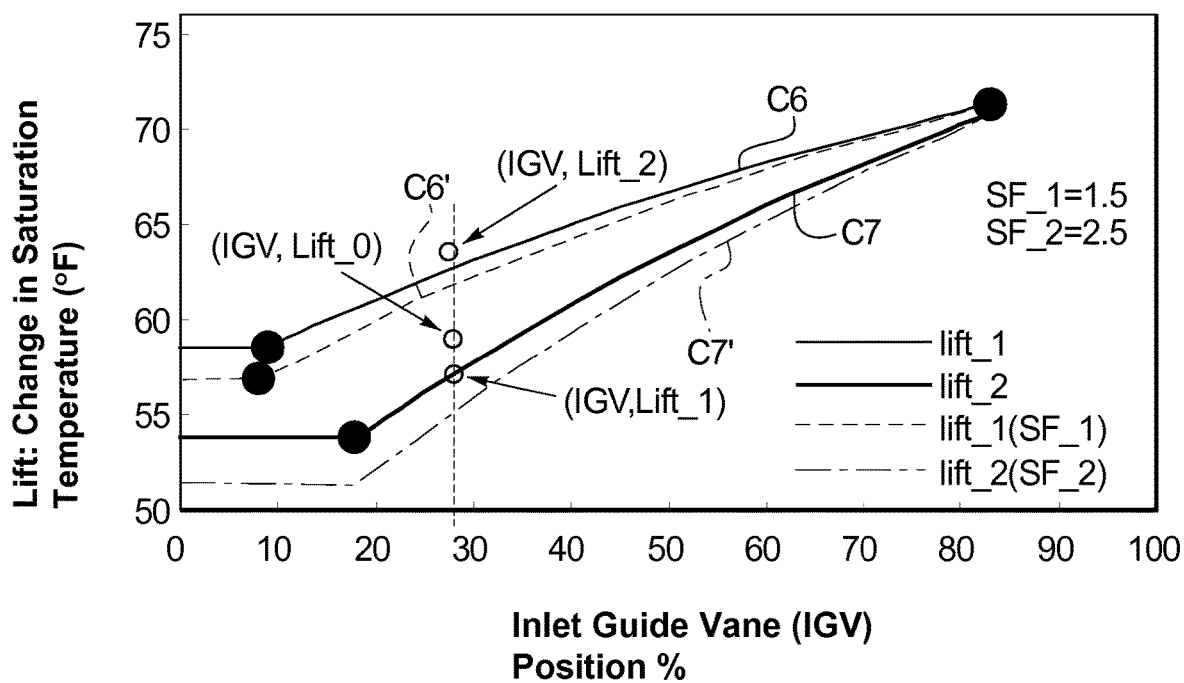
FIG. 6B graphically illustrates safety controlled full and part load relationships between reference lift and guide vane position according to a disclosed second approach of controlling a disclosed centrifugal compressor.

The reference lift profiles of FIGS. 5A and 5B obtained using the first and second approaches, respectively, may also be adjusted for safety as shown in FIGS. 6A and 6B, respectively. For example, the control algorithm may be input with safety factors which adjust the respective reference lift profiles C4, C5, C6, C7 of FIGS. 5A and 5B to the reference lift profiles C4', C5', C6', C7' of FIGS. 6A and 6B. More specifically, the safety factors are simply added to the original curves C4, C5, C6, C7, except where the guide vane and diffuser positions are fully opened or at a maximum. The safety factors may be adjustable from within the controller 16 by an end user or a service technician to accommodate for any imperfections associated with the condenser, cooler, or the like.

Figure 7:
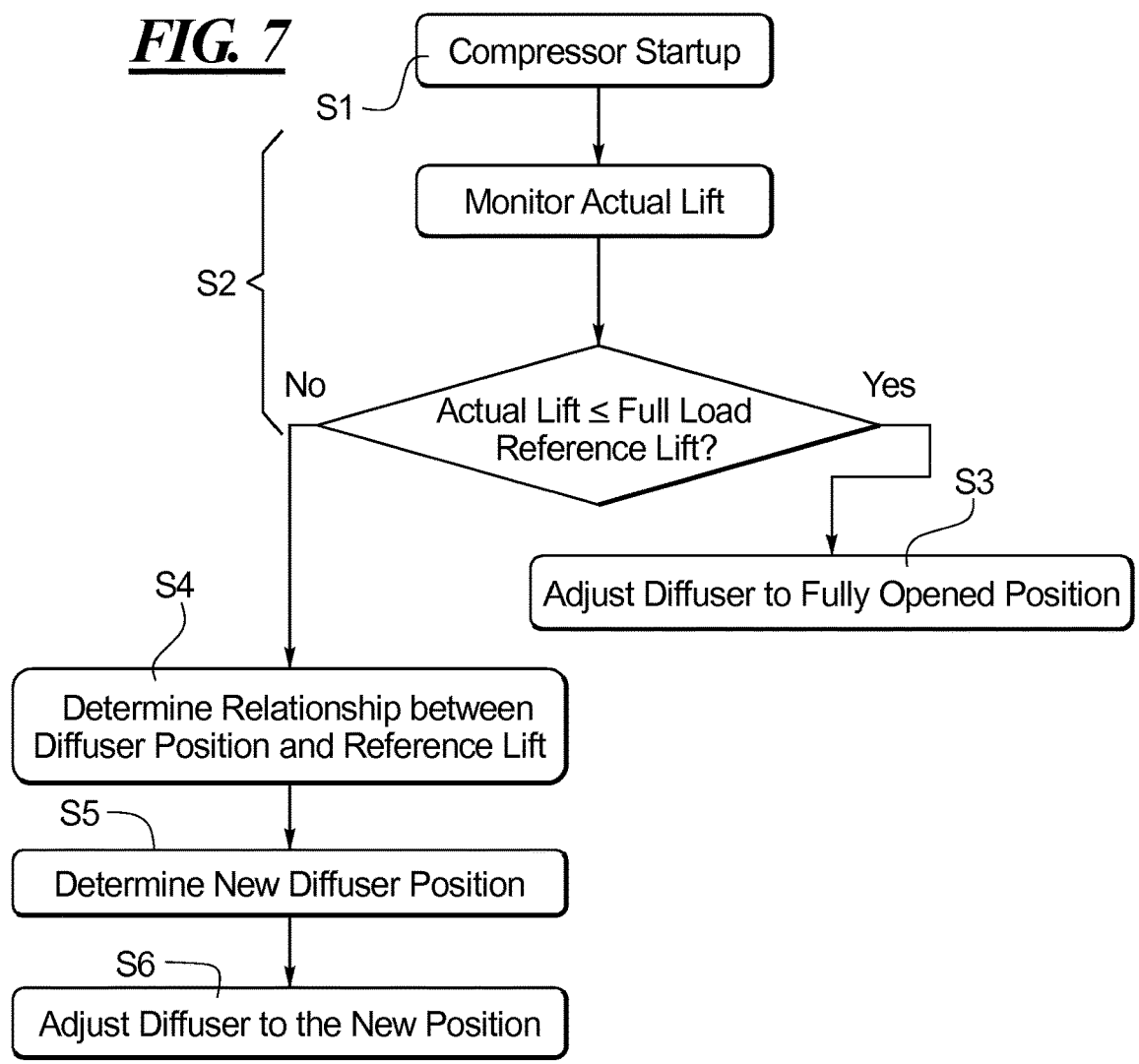
FIG. 7 schematically illustrates a flow diagram of a disclosed controller for use with a disclosed centrifugal compressor.

Referring now to FIG. 7, a flow chart of an exemplary control algorithm for adjusting diffuser position based in part on lift is provided. As an initial step S1, the compressor 10 may enter a startup mode, wherein the chiller of the compressor 10 is started and left to operate for a predetermined period of time, or until the compressor 10 has stabilized. During step S1, the position of the diffuser 14 may be adjusted according to a fixed relationship between the guide vane and diffuser position, for example, the diffuser position profile C2 of FIG. 4. Once the compressor 10 has stabilized, the controller 16 may begin monitoring lift in step S2. More specifically, the controller 16 may be configured to detect the actual lift, and compare the actual lift with a reference lift at full load for the given guide vane position. For instance, the actual lift may be compared with the corresponding reference lift according to curve C5 of FIG. 5A or curve C7 of FIG. 5B. If the actual lift is determined to be less than or equal to the reference lift, the controller 16 may adjust the diffuser 14 to be fully opened in step S3. If the actual lift is determined to be greater than the reference lift, the controller 16 may determine the optimum diffuser position at part load and the reference lift at part load at the given guide vane position in step S4. Specifically, the control algorithm may refer to curve C2 of FIG. 4 to determine the optimum diffuser position at part load, and refer to any one of curves C4, C6 of FIGS. 5A and 5B to determine the reference lift at part load for the given guide vane position. In step S5, the controller 16 may be configured to calculate a new diffuser position based on a relationship between the optimum diffuser position and reference lift determined in step S4. In step S6, the controller 16 may adjust the diffuser 14 to the new diffuser position determined in step S5.

Figure 8:
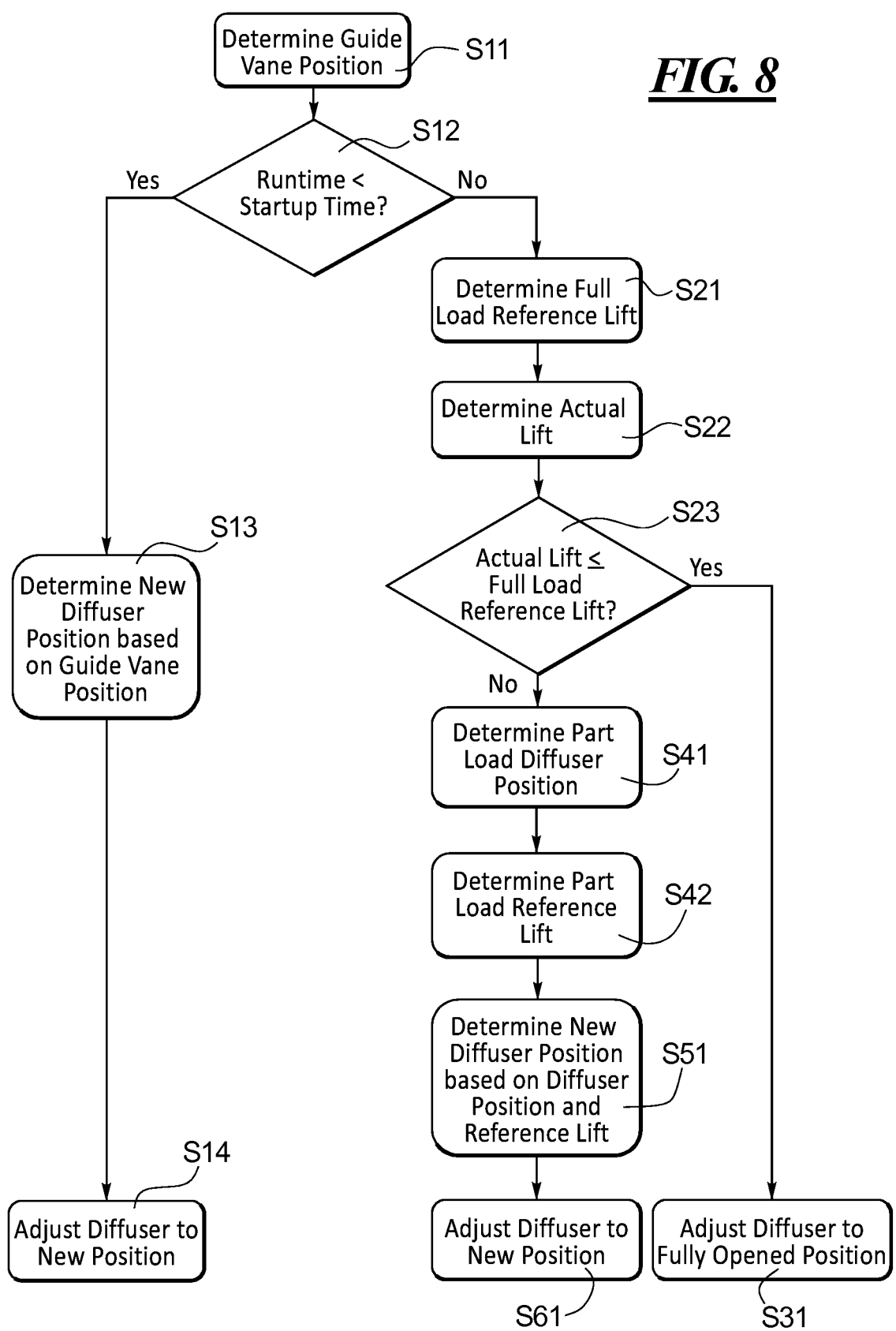
FIG. 8 schematically illustrates another flow diagram of a disclosed controller for use with a disclosed centrifugal compressor.

Turning to FIG. 8, a flow chart of another control algorithm, similar to that of FIG. 7, is provided in more detail. The compressor 10 may initially enter a startup mode, wherein the chiller of the compressor 10 may be started and left to operate for a predetermined period of time, or startup time. During the startup mode, the controller 16 may calculate the current position of the guide vanes 12 in step S11. The controller 16 may also determine if the startup runtime has elapsed in step S12. If the startup time has not expired, the controller 16 may calculate a new diffuser 14 position in step S13 based on a predetermined diffuser position profile, such as curve C2 of FIG. 4. Accordingly, the controller 16 may adjust the diffuser 14 of the compressor 10 to the new position in step S14. Steps S11-S14 may repeat until the startup runtime has elapsed in step S12.

Once the startup runtime has exceeded the predetermined limit in step S12, the controller 16 may end the startup mode and calculate a reference lift at full load in step S21. In particular, the controller 16 may refer to a predetermined reference lift profile, such as curves C5, C7 of FIGS. 5A and 5B, respectively, to determine the reference lift value at the given guide vane position. The controller 16 may calculate the actual lift in step S22 and compare the actual lift to the full load reference lift in step S23. In particular, if the actual lift is less than or equal to the full load reference lift, the controller 16 may adjust the diffuser 14 to a fully opened position in step S31.

If the actual lift is determined to be greater than the full load reference lift, the controller 16 may proceed to step S41. In step S41, the controller 16 may determine an optimized diffuser position at part load. In particular, the controller 16 may refer to a predetermined diffuser position profile, such as curve C2 of FIG. 4, to determine the optimized diffuser position for the given guide vane position. In step S42, the controller 16 may refer again to the reference lift profiles, or any one of profiles C4, C6 of FIGS. 5A and 5B, to determine a part load reference lift at the given guide vane position. Using both the optimized diffuser position and reference lift at part load determined in steps S41 and S42, respectively, the controller 16 may determine a new diffuser position in step S51. For example, the controller 16 may linearly interpolate between the optimized diffuser position at part load and the optimized diffuser position at full load, to construct a new diffuser position profile as a function of reference lift. More specifically, the control algorithm may calculate the new diffuser position according to the expression $$DF_{new} = \frac{DF_{full} - DF_{part}}{Lift_{full} - Lift_{part}} A?(Lift_{actual} - Lift_{part}) \bigg| DF_{part} \qquad (2)$$

where $DF_{new}$ is the new diffuser position, $DF_{full}$ is the optimized diffuser position at full load, $DF_{part}$ is the optimized diffuser position at part load, $Lift_{actual}$ is the actual lift detected, $Lift_{full}$ is the full load reference lift and $Lift_{part}$ is the part load reference lift. Using such a profile, the controller 16 may determine a new optimum position of the diffuser 14 that does not rely solely upon the inlet guide vane position, but also on reference lift. Accordingly, in step S61, the controller 16 may adjust the diffuser 14 to the new position determined in step S51 for optimum compressor 10 performance and efficiency.

The control algorithm of the controller 16 may also input additional load lines which may be specified by an end user, associated with a geographic region, or the like. For example, two new load lines corresponding to the geographic regions of the United States of America and Asia may be provided. Each of the two new load lines may provide a reference lift profile based on guide vane position as well as an optimal diffuser position profile based on guide vane position. Accordingly, the resulting four new curves or profiles may include a lift profile for the U.S., a lift profile for Asia, a diffuser position profile for the U.S. and a diffuser position profile for Asia.

The new load lines and the resulting new profiles may be used in conjunction with the control algorithms of FIGS. 7 and 8. For example, when used in conjunction with the algorithm of FIG. 8, a total of four reference lift profiles may be obtained based on a given guide vane position. The reference lift profiles may include part load reference lifts, full load reference lifts, reference lifts for the U.S. and reference lifts for Asia. Similarly, the new load lines may provide optimized diffuser position profiles for part load, full load, the U.S. and Asia. After determining the actual lift, the controller 16 may begin a series of comparisons to determine which profiles to use for reference. For instance, if the actual lift is greater than the corresponding reference lift for Asia, then the part load reference lifts, the reference lifts for Asia, diffuser position profile at part load and diffuser position profile for Asia may be used as references. The control algorithm may then calculate the new diffuser position according to the equation $$DF_{new} = \frac{DF_{Asia} - DF_{part}}{Lift_{Asia} - Lift_{part}} A?(Lift_{actual} - Lift_{part}) + DF_{part} \qquad (3)$$

modified from equation (2) above. If the actual lift is less than or equal to the corresponding reference lift for Asia but greater than that for the U.S., then the reference lifts for Asia and the U.S. as well as the diffuser position profiles for Asia and the U.S. may be used as references. The new diffuser position may then be determined according to the equation $$DF_{new} = \frac{DF_{Asia} - DF_{U.S.}}{Lift_{Asia} - Lift_{U.S.}} A?(Lift_{actual} - Lift_{U.S.}) + DF_{U.S.} \quad (4)$$

If the actual lift is less than or equal to the part load reference lift and each of the corresponding reference lifts for Asia and the U.S., then the diffuser may be adjusted to the fully opened position. If the actual lift is less than or equal to each of the corresponding reference lifts for Asia and the U.S., but is greater than the part load reference lift, then the reference lift profile for the U.S. and the full load reference lift profile may be used as references. Moreover, a new diffuser position may be determined based on a predetermined fixed relationship between optimum diffuser position and the given guide vane position, for example, curves C1 and C2 of FIGS. 3 and 4.

Controlling diffuser position based on inlet guide vane position and lift, as disclosed in the flow diagrams of FIGS. 7 and 8, may provide a compressor 10 with optimum performance and efficiency. However, to protect the compressor 10 and its users from surge, additional steps to the control algorithm may be required. For example, while operating according to any one of the control algorithms of FIGS. 7 and 8, the controller 16 may concurrently monitor the flow through the compressor 10 for signs of surge. At the first sign of a surge, the control algorithm may pause or end the instant control logic for a predetermined period of time, and further, close the diffuser 14 until the surge has subsided. More specifically, the controller 16 may at least partially close the diffuser 14, increment a surge counter and begin a surge timer at the first instance of surge detection. The controller 16 may be configured to wait at least one surge period before returning to normal operation. One surge period may be a predetermined period of time, for example, five seconds, during which the compressor 10 should standby for the surge to clear. If the surge has not cleared by the end of one surge period, the surge counter may be incremented once more and the surge timer may be restarted. The controller 16 may repeat these steps until the surge timer indicates the end of one surge period and finds no sign of surge, at which point normal operation may commence.

Figure 9:
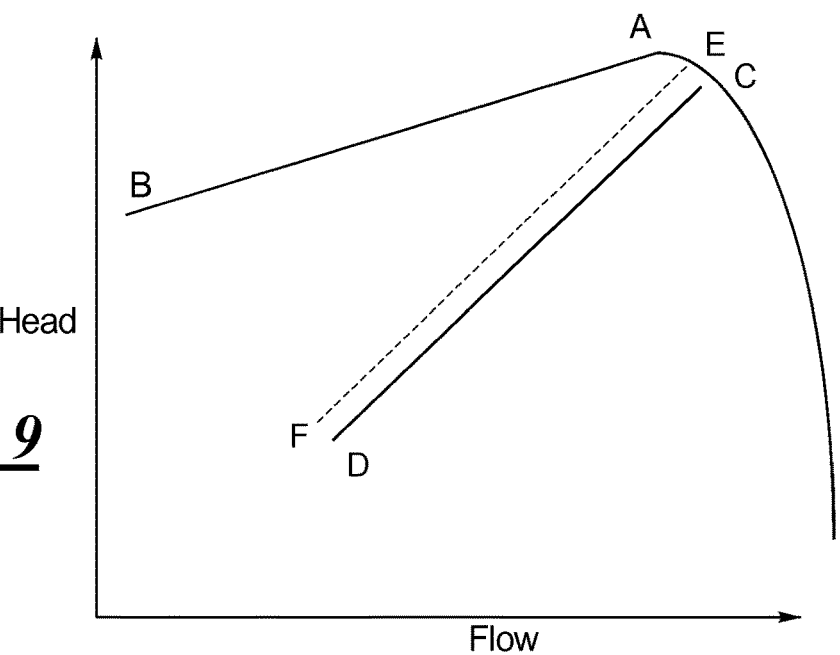
FIG. 9 graphically illustrates another operating map of a disclosed centrifugal compressor.

An operating map of a compressor 10 operating in accordance with another surge protection algorithm is provided in FIG. 9. Line AB of FIG. 9 may correspond to a surge line associated with an algorithm for controlling diffuser position based on a predetermined fixed relationship between guide vane and diffuser positions, as shown in FIGS. 3 and 4. Line CD may correspond to an algorithm for controlling diffuser position based on guide vane position and lift, as shown in FIGS. 5A and 5B. Line EF may correspond to the surge line of a user-specified load line. Both lines EF and CD may be determined from testing. The head and flow measurements may be determined based on guide vane positions, water flow measurements and pressure measurements taken at the respective inlets and outlets of the compressor 10. Both algorithms corresponding to lines AB and CD may be loaded into the control algorithm of the controller 16. When the compressor 10 operates within or along the user-specified load line EF, the controller 16 may control diffuser position based on the algorithm associated with line CD. However, when the compressor 10 operates at a point beyond the user-specified load line EF, the controller 16 may control diffuser position based on the algorithm associated with surge line AB to ensure surge free operation. The controller 16 may then return control along the user-specified load line CD if the compressor 10 operates at a point along or below the user-specified load line EF.

INDUSTRIAL APPLICABILITY

In satisfaction of the above-identified needs, an improved control algorithm of a controller 16 for a centrifugal compressor 10 is disclosed that comprises adjustable guide vanes 12 and a variable diffuser 14. The controller 16 is preprogrammed with optimized diffuser positions as well as reference lift values for different guide vane positions. The controller 16 determines the next best diffuser position based on the actual lift and the given guide position to improve performance and efficiency at part load. The controller 16 concurrently monitors for surges and responds by closing the diffuser or by shifting controls to a different algorithm. The disclosed methods of controlling a centrifugal compressor 10 maintain full load performance and efficiency, and significantly improve part load performance and efficiency without adversely affecting the surge margin.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A method for controlling a centrifugal compressor having adjustable guide vanes and a variable diffuser, comprising the steps of:
   storing a predetermined profile for optimized diffuser position and reference lift with respect to guide vane position at a part load and a full load on a controller of the centrifugal compressor;
   accessing the stored predetermined profile on the controller of the centrifugal compressor;
   identifying actual lift of the centrifugal compressor;
   identifying an actual guide vane position of the centrifugal compressor;
   correlating a relationship between diffuser position and reference lift from the predetermined profile based on the actual guide vane position;
   calculating a new diffuser position based on the actual lift, actual guide vane position and the relationship between diffuser position and reference lift from the predetermined profile;
   retrieving a full load reference lift from the predetermined profile based on the actual guide vane position and a fully opened diffuser;
   adjusting the diffuser to the fully opened position if the actual lift is less than or equal to the full load reference lift; and
   adjusting the diffuser to the new diffuser position if the actual lift is greater than the full load reference lift.

2. The method of claim 1, wherein the relationship between diffuser position and the reference lift from the predetermined profile includes part and full load characteristics.

3. The method of claim 2, wherein the part load relationship between diffuser position and the reference lift from the predetermined profile is based on data per a 0.5 degree turndown load line corresponding to a 0.5 degree reduction in entering condenser water temperature for every 10% change in load.

4. The method of claim 1, wherein the new diffuser position is based on a linear interpolation of the actual lift, actual guide vane position and the relationship between diffuser position and reference lift from the predetermined profile.

5. The method of claim 1, wherein the diffuser position at full load is a constant value corresponding to a fully opened diffuser position.

6. The method of claim 1, wherein the relationship between diffuser position and the reference lift from the predetermined profile is adjusted with at least one safety factor.

7. The method of claim 1, wherein the relationship between diffuser position and the reference lift from the predetermined profile is adjusted according to load lines corresponding to at least one regional geographic location.

8. The method of claim 1 further comprising a step of signaling an actuator to adjust the diffuser to a closed position if a surge is detected.

9. A method for controlling a centrifugal compressor having adjustable guide vanes and a variable diffuser after compressor startup, comprising the steps of:
storing a predetermined profile for optimized diffuser position and reference lift with respect to guide vane position at a part load and a full load on a controller of the centrifugal compressor;
accessing the stored predetermined profile on the controller of the centrifugal compressor;
correlating a first relationship between a current guide vane position and a full load reference lift from the predetermined profile;
identifying an actual lift of the centrifugal compressor;
adjusting the diffuser to a fully opened position if the actual lift is less than the full load reference lift;
correlating a second relationship between the current guide vane position and diffuser position at part load;
correlating a third relationship between the current guide vane position and a part load reference lift from the predetermined profile;
correlating a fourth relationship between diffuser position and a reference lift from the predetermined profile based on the second and third relationships;
calculating a new diffuser position based on the fourth relationship; and
adjusting the diffuser to the new diffuser position.

10. A method for controlling a centrifugal compressor having adjustable guide vanes and a variable diffuser, comprising the steps of:
storing a predetermined profile for optimized diffuser position and optimized lift with respect to guide vane position at a part load and a full load on a controller of the centrifugal compressor;
accessing the stored predetermined profile on the controller of the centrifugal compressor:
identifying an actual guide vane position of the centrifugal compressor;
correlating a first relationship between the actual guide vane position and diffuser position;
calculating a first diffuser position based on the first relationship;
adjusting the diffuser to the first diffuser position if the centrifugal compressor is in a startup state;
correlating a second relationship between the actual guide vane position and full load reference lift from the predetermined profile;
retrieving full load reference lift from the predetermined profile based on the second relationship and the actual guide vane position;
identifying an actual lift of the centrifugal compressor;
adjusting the diffuser to a fully opened position if the actual lift is less than the full load reference lift;
determining a third relationship between the actual guide vane position and diffuser position at part load;
correlating a fourth relationship between the actual guide vane position and a part load reference lift from the predetermined profile;
correlating a fifth relationship between diffuser position and a reference lift from the predetermined profile based on the third and fourth relationships;
calculating a second diffuser position based on the fifth relationship; and
adjusting the diffuser to the second suggested diffuser position if the centrifugal compressor is in a normally operating state.

11. The method of claim 10, wherein the fifth relationship is a linear interpolation of the actual lift, the actual guide vane position and the fifth relationship.

12. The method of claim 10, wherein the diffuser position at full load is a constant value corresponding to a fully opened diffuser position.

13. The method of claim 10, wherein part load relationships are based on data per a 0.5 degree turndown load line corresponding to a 0.5 degree reduction in entering condenser water temperature for every 10% change in load.

14. The method of claim 10, wherein each of the second and fourth relationships is adjusted with at least one safety factor.

15. The method of claim 14, wherein the at least one safety factor is adjustable through an interface of the compressor by a user.

16. The method of claim 10, wherein the startup state corresponds to compressor runtime of ten minutes or less and the normally operating state corresponds to runtime exceeding ten minutes.

17. The method of claim 10, wherein the diffuser is adjusted to a fully closed position for at least one surge period in an event of a surge.

18. The method of claim 17, wherein the surge period is approximately five seconds.

19. The method of claim 17, wherein a surge counter is incremented for each surge event and decremented at the end of each surge period if no additional surge events are detected.

20. The method of claim 10, wherein the diffuser is adjusted according to additional load lines corresponding to one or more geographical region.

* * * * *